United States Patent
Mohammed et al.

(10) Patent No.: US 11,745,863 B2
(45) Date of Patent: Sep. 5, 2023

(54) METHOD AND SYSTEM FOR ENGINE WINDMILLING CONTROL

(71) Applicant: PRATT & WHITNEY CANADA CORP., Longueuil (CA)

(72) Inventors: Kashif Mohammed, Brossard (CA); Patrick Manoukian, Saint-Laurent (CA); Patrice Remy, St-Hubert (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 1000 days.

(21) Appl. No.: 16/368,024

(22) Filed: Mar. 28, 2019

(65) Prior Publication Data

US 2020/0283138 A1  Sep. 10, 2020

Related U.S. Application Data

(60) Provisional application No. 62/813,954, filed on Mar. 5, 2019.

(51) Int. Cl.
*H02P 3/08* (2006.01)
*B64C 27/57* (2006.01)
*B64C 27/32* (2006.01)
*F02C 7/268* (2006.01)
*F02N 11/08* (2006.01)

(52) U.S. Cl.
CPC ............ *B64C 27/57* (2013.01); *B64C 27/325* (2013.01); *F02C 7/268* (2013.01); *F02N 11/08* (2013.01); *H02P 3/08* (2013.01); *F05B 2270/32* (2013.01)

(58) Field of Classification Search
CPC .......... F02C 7/262; F02C 9/28; F05D 2260/85
See application file for complete search history.

(56) References Cited

U.S. PATENT DOCUMENTS

| | | | | |
|---|---|---|---|---|
| 3,557,743 A | * | 1/1971 | Rubis | B63H 23/32 440/74 |
| 3,812,411 A | * | 5/1974 | Johnson | H02P 3/12 290/17 |
| 4,456,204 A | * | 6/1984 | Hapke | B64D 33/02 244/58 |
| 6,312,215 B1 | * | 11/2001 | Walker | F01D 21/04 188/74 |
| 6,960,900 B2 | * | 11/2005 | Fogarty | H02P 9/04 322/29 |
| 7,621,117 B2 | | 11/2009 | Dooley et al. | |
| 7,849,668 B2 | | 12/2010 | Sheridan | |
| 9,885,288 B2 | | 2/2018 | Francisco | |
| 10,180,080 B2 | * | 1/2019 | Munevar | F02C 7/36 |

(Continued)

*Primary Examiner* — Gerald L Sung
(74) *Attorney, Agent, or Firm* — Norton Rose Fulbright Canada LLP

(57) ABSTRACT

Methods and systems for controlling windmilling in an engine are described. An electric starter motor is coupled to the engine, a circuit element is coupled to the electric starter engine and to a DC signal source, and a control system coupled to the engine and to the circuit element. The control system is configured for: determining whether the engine is in a windmilling state; when the engine is in a windmilling state, commanding the circuit element to apply a DC signal to the electric starter motor; and modulating the DC signal applied to the electric starter motor to control a level of rotational motion of the engine.

20 Claims, 4 Drawing Sheets

(56) References Cited

U.S. PATENT DOCUMENTS

| | | | | |
|---|---|---|---|---|
| 2007/0193277 A1* | 8/2007 | Sheoran | ............... | F02C 7/057 60/802 |
| 2007/0245709 A1* | 10/2007 | Dooley | ............... | F02C 7/262 60/767 |
| 2007/0289310 A1* | 12/2007 | Dooley | ............... | F01D 15/10 60/773 |
| 2008/0098712 A1* | 5/2008 | Sheridan | ............... | F01D 15/10 60/226.1 |
| 2017/0284220 A1* | 10/2017 | Roberge | ............... | F02C 7/36 |

* cited by examiner

METHOD AND SYSTEM FOR ENGINE WINDMILLING CONTROL

TECHNICAL FIELD

The application relates generally to engine control systems, and more specifically to systems for addressing engine windmilling.

BACKGROUND OF THE ART

Many aircraft have auxiliary power units (APU), typically mounted in a tailcone of an aircraft separate from other aircraft engines, which serve to supply electricity to various aircraft systems and to provide compressed air for the aircraft. The APU has a lubricating system which circulates a lubricating fluid, for example oil, between components of the APU.

In certain stages of operation of the aircraft where the APU is non-operational, air circulation in the vicinity of the APU can cause rotatable components of the APU to windmill. This, in turn, can cause lubricating fluid to unnecessarily circulate through the APU, which can affect fire safety, and can cause unnecessary wear and tear to the APU.

As such, there is room for improvement.

SUMMARY

In accordance with a broad aspect, there is provided a method for controlling windmilling in an engine. A determination is made regarding whether the engine is in a windmilling state. When the engine is in the windmilling state, a circuit element is commanded to apply a DC signal to an electric starter motor which is coupled to the engine. The DC signal applied to the electric starter motor is modulated to control a level of rotational motion of the engine.

In accordance with another broad aspect, there is provided a system for controlling windmilling in an engine. The system comprises an electric starter motor coupled to the engine, a circuit element coupled to the electric starter engine and to a DC signal source, and a control system coupled to the engine and to the circuit element. The control system is configured for: determining whether the engine is in a windmilling state; when the engine is in a windmilling state, commanding the circuit element to apply a DC signal to the electric starter motor; and modulating the DC signal applied to the electric starter motor to control a level of rotational motion of the engine.

DESCRIPTION OF THE DRAWINGS

Reference is now made to the accompanying figures in which.

DETAILED DESCRIPTION

Figure 1:
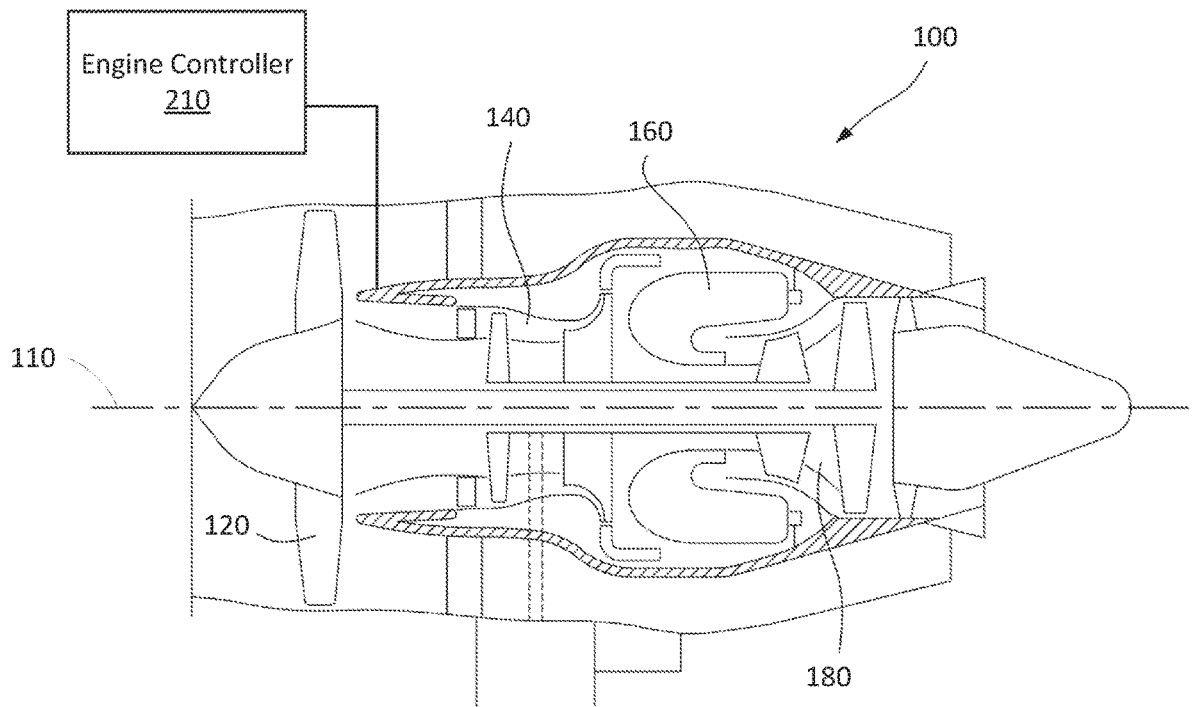
FIG. 1 is a schematic cross-sectional view of an example engine, in accordance with one or more illustrative embodiments.

With reference to FIG. 1, there is illustrated a gas turbine engine 100. Note that while engine 100 is a turbofan engine, the methods and systems described herein may be applicable to turboprop, turboshaft, and other types of gas turbine engines, or combustion engines generally. In addition, the engine 100 may be an auxiliary power unit (APU), an auxiliary power supply (APS), a hybrid engine, or any other suitable type of engine. In addition, although the foregoing discussion relates to a singular engine 100, it should be understood that the techniques described herein can be applied substantially concurrently to multiple engines.

The engine 100 generally comprises in serial flow communication: a fan 120 through which ambient air is propelled, a compressor section 140 for pressurizing the air, a combustor 160 in which the compressed air is mixed with fuel and ignited for generating a stream of hot combustion gases, and a turbine section 180 for extracting energy from the combustion gases. Axis 110 defines an axial direction of the engine 100. In some embodiments, a low pressure spool is composed of a low pressure shaft and a low pressure turbine. The low pressure shaft drives the propeller 120. A high pressure spool is composed of a high pressure turbine attached to a high pressure shaft, which is connected to the compressor section 140. It should be noted that other configurations for the engine 100 are also considered.

Control of the operation of the engine 100 can be effected by one or more control systems, for example an engine controller 210. The engine controller 210 can modulate a fuel flow rate provided to the engine 100, the position and/or orientation of variable geometry mechanisms within the engine 100, a bleed level of the engine 100, and the like.

In the course of normal operation, there may be periods of time during which the engine 100 is inoperative. For instance, if the engine 100 is an APU of an aircraft, there may be certain times during which the operator of the aircraft, or an aircraft-level control system, commands the engine 100 to be shut off or otherwise rendered inoperative. If the engine 100 is shut off during a flight operation, or during high wind conditions, the engine 100 can begin to experience a phenomenon known as windmilling, in which one or more rotatable components of the engine 100 exhibit rotational motion due to airflow from an external source. Windmilling can occur in a variety of circumstances, and due to a variety of factors. In some cases, windmilling occurs during flight because an inlet to the engine 100 is open, causing the engine 100 to be subjected to a flow of air from the inlet. In other cases, windmilling occurs during flight because the engine inlet is permanently open. In still other cases, windmilling occurs when the aircraft is on the ground and exposed to high winds or similar weather conditions. It should be noted that in certain cases, the engine 100 is substantially unpowered when experiencing windmilling. Other causes of windmilling are also considered.

Figure 2:
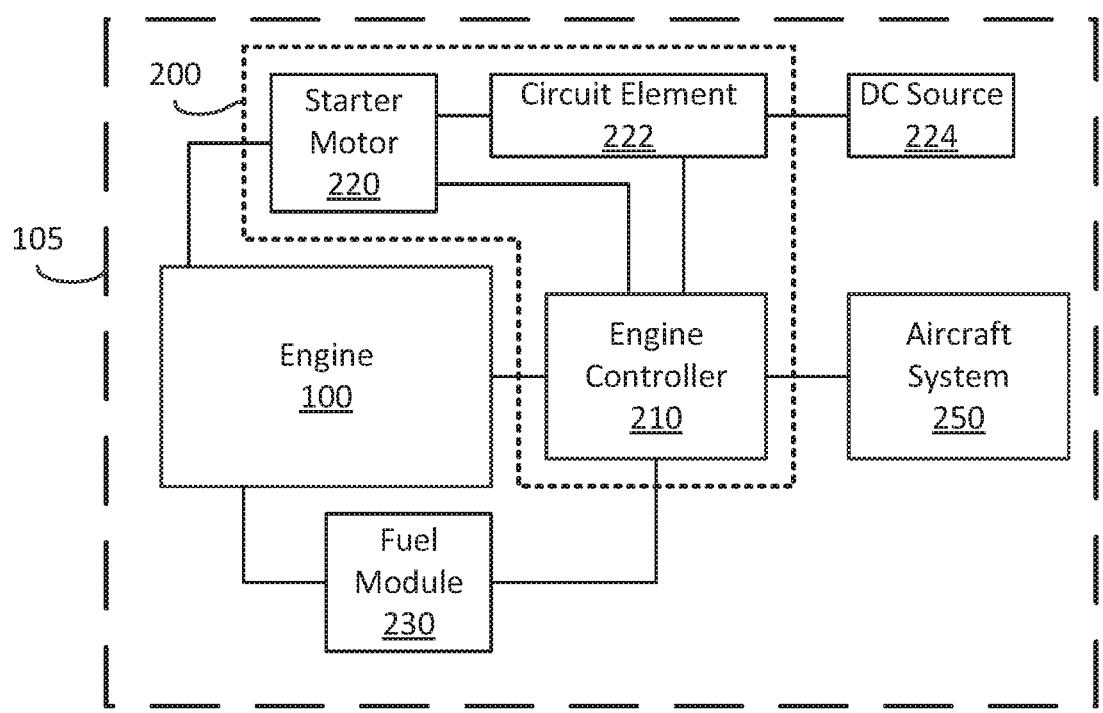
FIG. 2 is a block diagram of an example system for controlling engine windmilling, in accordance with one or more illustrative embodiments.

With reference to FIG. 2, there is shown a system 200 for controlling engine windmilling, for instance the engine 100. In some embodiments, the system 200 is implemented in the context of an aircraft 105, and is therefore coupled to an aircraft system 250. In other embodiments, the system 200 is implemented in different contexts, such as an industrial context, or in the context of another vehicle, and the system 200 can be coupled to different control systems, as appropriate.

The system 200 is coupled to the engine 100 and is composed of an engine controller 210, a starter motor 220, and a circuit element 222. The engine controller 210 serves to control the operation of the engine 100, and can be composed of any suitable hardware and software for controlling operation of the engine 100. In some embodiments, the engine controller 210 is implemented via a full-authority digital engine controller (FADEC) or similar device. In embodiments in which the engine controller 210 is used in the context of the aircraft 105, the engine controller 210 is configured for controlling operation of more than one engine 100 substantially concurrently. The engine controller 210 is also configured for logging various information about aircraft usage and operating conditions, including engine speed, engine operating state, and the like, and to log the occurrence of certain events, for example fire events.

The engine controller 210 is coupled to the aircraft system 250 for receiving therefrom various instructions, for instance as provided by an operator of the engine 100. The engine controller 210 is also connected to the engine 100, the starter motor 220, the circuit element 222, and to a fuel module 230. The engine controller 210 is configured for providing instructions to the engine 100, the starter motor 220, the circuit element 222, and the fuel module 230, for instance to alter the operation thereof, in accordance with the techniques disclosed herein. It should be noted that although the engine controller 210 is shown here as a single element, in certain embodiments the engine controller 210 can be composed of multiple controllers working collaboratively. For example, the engine controller 210 can be composed of separate devices for controlling the engine 100 and the starter motor 220. Other examples are also considered.

In addition, the engine controller 210 is configured for acquiring various information from the elements to which it is connected, including the engine 100, the starter motor 220, the circuit element 222, the fuel module 230, and the aircraft system 250. To this end, the engine controller 210 can be provided with, or be coupled to, a variety of sensors to allow the engine controller 210 to monitor operating conditions of the engine 100 and/or other components to which the engine controller 210 is coupled. For example, the engine 100 can include one or more sensors of various types which collect information about the operating conditions of the engine 100, and which is provided to the engine controller 210. In another example, the fuel module 230 can include one or more sensors, such as a fuel flow rate sensor, and can provide information regarding rate of fuel flow toward the engine 100 to the engine controller 210. Other sources, and types, of information are considered.

The starter motor 220 serves to assist with the engine start sequence 100: when the engine is inoperative, the starter motor 220 can be coupled to the engine 100 to facilitate, or initiate, the ignition process for the engine 100. The starter motor 220 can be any suitable type of electrical motor, for instance powered by a direct current (DC) source 224. In addition, the starter motor 220 can be used as a generator in certain circumstances: when the engine 100 is operational, the starter motor 220 can be mechanically coupled to the engine 100 and caused to rotate with the engine 100. In this fashion, the starter motor 220 can be used to produce electricity, for instance for use within the aircraft 105.

The circuit element 222 serves to manage the electrical coupling between the starter motor 220 and the DC source 224, and optionally with one or more additional electrical sources and/or systems. For example, the circuit element 222 includes a switch or other similar element which can be moved between an open state and a closed state by the engine controller 210. In another example, the circuit element 222 includes one or more additional switches for connecting the starter motor 220 to various electrical systems to allow the starter motor 220 to provide the electrical systems with electrical power, for instance when the starter motor 220 is acting as a generator.

The system 200 is also connected to the DC source 224 and the fuel module 230. The DC source 224 can be any suitable source of DC current, including a battery, a capacitor or capacitor-based system, an inverter connected to an alternating current (AC) source, or the like. For example, the DC source 224 can include a capacitor bank which can be charged during operation of the engine 100 or another engine. In this fashion, if other elements within the DC source 224 fail due to a fire event or other event, the capacitor bank can provide DC current to the starter motor 220. The fuel module 230 serves to control the flow of fuel to the engine 100. The operation of the fuel module 230 can be controlled by the engine controller 210, for example based on instructions received from the aircraft system 250, or based on algorithms and/or schedules available to the engine controller 210.

In operation, the engine controller 210 can monitor the operating state of the engine 100, for example to detect undesirable behaviour, including windmilling. If the engine 100 is found to be windmilling, the engine controller 210 can use the starter motor 220 to control the level of windmilling of the engine 100, including reducing the level of windmilling, stopping the windmilling, and/or preventing the windmilling of the engine 100.

The engine controller 210 can rely on different factors to determine whether the engine 100 is windmilling. The engine controller 210 can evaluate one or more of the factors when assessing whether windmilling is occurring, or likely to occur. It should be noted that the foregoing discussion of various factors indicative of windmilling in the engine 100 presents various factors in particular combinations, but the use of each of the factors individually, or in any suitable combination, is also considered.

In some embodiments, the engine controller 210 determines whether the aircraft 105 is airborne. The engine controller 210 can perform this evaluation using any suitable techniques. For example, the engine controller 210 can use readings from a pressure sensor to determine whether the atmospheric pressure in the vicinity of the aircraft 105 is indicative of the aircraft being airborne. In some instances, the engine controller 210 can determine or estimate an altitude for the aircraft 105. If the engine 100 and/or the aircraft 105 are designed with an inlet duct to the engine 100 being permanently open, the engine controller 210 can determine that windmilling of the engine 100 is occurring on the basis of the aircraft 105 being airborne, or on the basis of the aircraft 105 being airborne above a certain altitude.

In some embodiments, the engine 100 and/or the aircraft 105 are designed with the inlet duct of the engine 100 being selectively closable, for instance via a mechanically-actuatable element. The engine controller 210 can determine whether the inlet duct of the engine 100 is open as part of determining whether the engine 100 is windmilling. For example, the engine controller 210 can query a sensor coupled to the inlet duct of the engine 100 to determine whether the inlet duct of the engine 100 is open. If the inlet duct of the engine 100 is open and, for example, the aircraft 105 is airborne, the engine controller 210 can determine that windmilling of the engine 100 is occurring.

In some embodiments, the engine controller 210 determines whether an operating state of the engine 100 corresponds to an "engine off" state. The engine controller 210 can query the aircraft system 250 to determine a commanded engine operating state, for instance as requested by an operator of the engine 100. Alternatively, or in addition, the engine controller 210 can receive instructions from the aircraft system 250 to set the engine operating state to the "engine off" state, or can automatically set the engine operating state to the "engine off" state based on algorithms or other control schemes operated by the engine controller 210. If the commanded engine operating state of the engine 100 is the "engine off" state, and the engine controller 210 determines that the inlet duct to the engine 100 is open and/or determines that a rotational speed of one or more components the engine 100 is exceeds a predetermined threshold, the engine controller can determine that windmilling of the engine is occurring. For example, a "windmilling threshold" can be established by a manufacturer, operator, or other authority. When the engine 100 is in the "engine off" state, and when the engine 100 is rotating above the windmilling threshold, the engine controller 210 can determine that windmilling is occurring.

Other approaches for determining whether windmilling is occurring are also considered. The engine controller 210 can employ any suitable number and combination of approaches for assessing windmilling, as appropriate. In addition, the engine controller 210 can, responsive to determining that a fire event is occurring in the vicinity of the engine 100, proactively take measures to prevent windmilling of the engine 100.

Once the engine controller 210 has determined that the engine 100 is windmilling, the engine controller 210 can then use the starter motor 220 to control the rotational motion of the engine 100 caused by the windmilling. This can include stopping the rotational motion, reducing the rotational motion, decelerating the rotational motion, or performing any other suitable type of control of the rotational motion of the engine 100. Optionally, upon determining that the engine 100 is windmilling, the engine controller 210 can first perform one or more safety tests to determine whether the starter motor 220 can safely be used to control the windmilling of the engine 100. For example, the engine controller 210 can perform a safety test to determine whether the starter motor 220 is functioning adequately, and can be safely used to control the windmilling of the engine 100.

To control the windmilling of the engine 100, the engine controller 210 can cause the starter motor 220 to act as a brake or load on the engine 100, and thereby reduce or prevent windmilling of the engine 100. The engine controller 210 causes the starter motor 220 to be mechanically coupled to the engine 100, and then causes a DC signal to be applied to the starter motor 220. The DC signal applied to the starter motor 220 causes the starter motor 220 to rotate, or to attempt to rotate, in a direction opposite to the rotation of the engine 100, thereby counteracting the windmilling of the engine 100.

In some embodiments, the circuit element 222 includes a circuit which reverses the polarity of the DC signal usually supplied by the DC source 224. For example, the DC source 224 can provide a "positive" DC signal, used by the starter motor 220 when assisting in the ignition or start-up sequence for the engine 100. When the inverter circuit of the circuit element 222 is activated, the positive DC signal can be inverted, thereby reversing the direction of motion of the starter generator. Other approaches are also considered, for example the use of a variable DC source 224.

In some embodiments, the engine controller 210 is configured for modulating the DC signal provided to the starter motor 220, for instance by controlling the operation of the circuit element 222. The DC signal can be modulated to alter the level of rotational motion of the engine 100, for instance resulting from windmilling. For example, a first DC signal can be used to substantially counteract the windmilling in the engine 100; that is to say, to substantially prevent any rotational motion in the engine 100. In another example a second DC signal can be used to reduce the level of rotational motion of the engine 100, for instance a predetermined safe level. The safe level can correspond to any suitable amount of rotational motion.

For instance, the safe level of rotational motion can be established based on a corresponding rotational speed for the engine 100 below or at which a lubricant system of the engine 100 is inoperative. In the event of a fire event or other unexpected event during flight of the aircraft 105, preventing the flow of lubricant within the engine 100 can lead to reduced risks of failure of the engine 100 and/or within the aircraft 105, and/or to reduced risk of other catastrophic failure. Thus, the starter motor 220 can be used to halt the flow of lubricant within the engine 100, and reduce or mitigate part or all of the risk associated with a fire event. In some embodiments, the system 200 is configured to first determine whether a fire event is occurring in the vicinity of the engine 100, and then to detect and, if necessary, reduce or prevent windmilling of the engine 100.

In some other embodiments, the engine controller 210 is configured for varying the modulation of the DC signal over time. For example, the DC signal can be modulated to gradually reduce the level of rotational motion of the engine 100 over a predetermined time period. Gradually reducing the level of rotational motion of the engine 100 may reduce the risk of damage to the engine 100 and/or to the starter motor 220. In another example, the windmilling of the engine 100 may complicate ignition of the engine 100, for instance by reducing the starting envelope for the engine 100. The DC signal to the starter motor 220 can be modulated to first reduce the level of rotational motion of the engine 100 to a level suitable for ignition, and then to maintain the level of rotational motion within a range around the level suitable for ignition until the engine 100 is successfully ignited. Other approaches are also considered. For instance, the engine controller 210 can substantially continuously monitor the level of rotational motion of the engine 100, and adjust the DC signal to respond to changes in the level of rotational motion, as appropriate.

In some embodiments, the engine controller 210 is also configured for modulating the DC signal based on the capabilities of the DC source 224. For instance, if the DC source 224 is an alternator which generates DC current from the operation of a separate engine, the engine controller 210 may evaluate the capability of the DC source 224, including the fuel cost associated with the operation of the separate engine, and the like, versus the requirement to reduce windmilling in the engine 100, before causing the DC signal to be applied to the starter motor 220. Other considerations are also envisaged.

It should also be noted that in some instances, the DC signal may be a 0 V signal. That is to say, the circuit element 222 may serve to short-circuit the terminals of the starter motor 220, thereby causing the starter motor to act as a mechanical load on the engine 100. In these embodiments, the windmilling of the engine 100 is reduced or prevented due to the mechanical load of the starter motor 220. In some instances, the engine controller 210 can monitor the level of rotational motion and apply a non-zero DC signal if the level of rotational motion goes beyond a predetermined threshold. Other control approaches are also considered.

Figure 3:
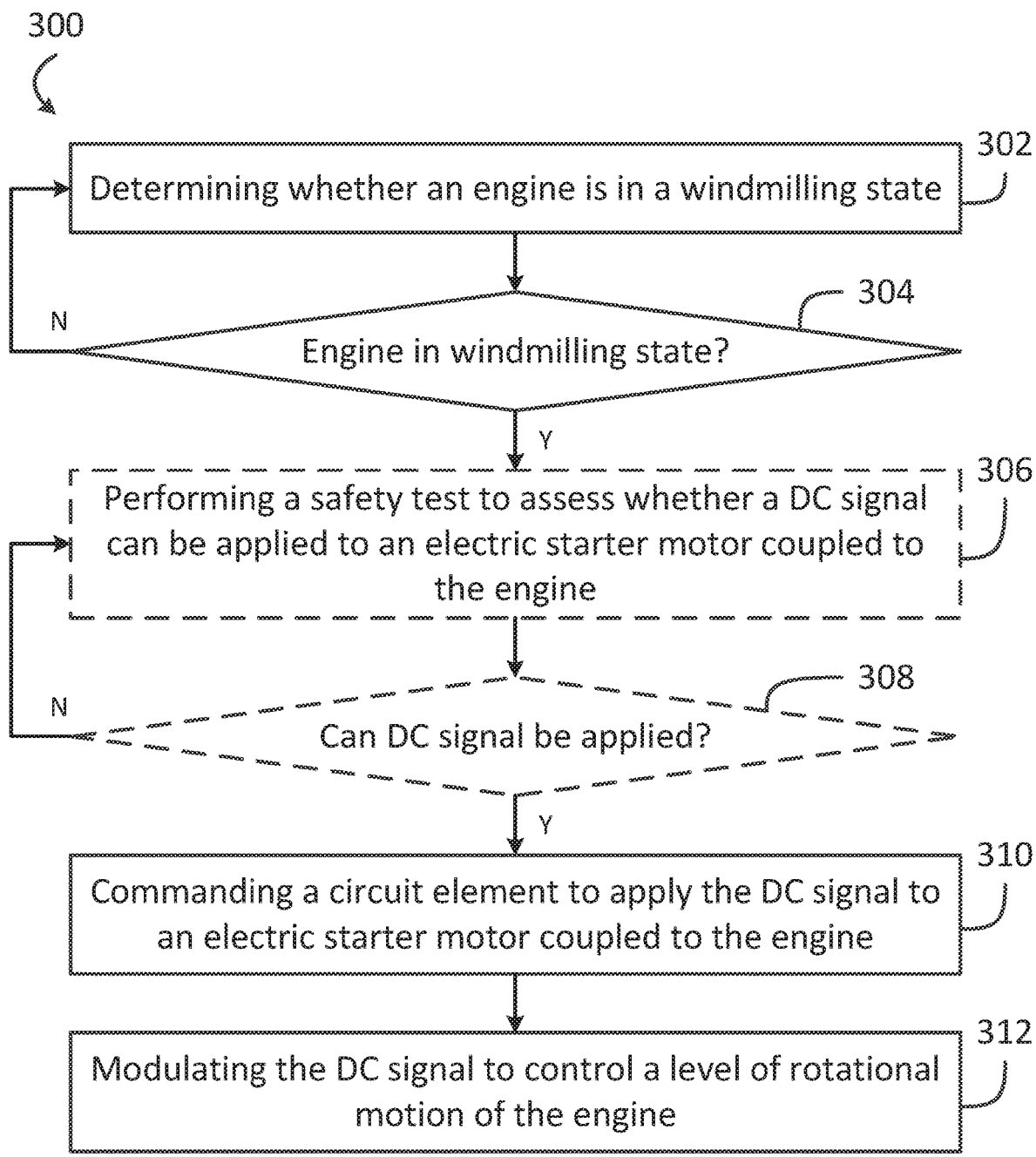
FIG. 3 is a flowchart of an example method for controlling engine windmilling, in accordance with one or more illustrative embodiments.

With reference to FIG. 3, there is shown a method 300 for controlling windmilling in an engine, for instance the engine 100. At step 302, a determination is made regarding whether the engine 100 is in a windmilling state. The determination can be based on any suitable combination of factors, including commanded engine operating state, engine speed, an airborne status of an aircraft of which the engine 100 is a part, an altitude of the aircraft, a status of an inlet duct to the engine 100, and the like.

At decision step 304, when the engine 100 is in the windmilling state, the method 300 proceeds optionally to step 306, or to step 310 if step 306 is not performed. When the engine 100 is not in the windmilling state, the method 300 can return to step 302.

Optionally, at step 306, a safety test is performed to assess whether a DC signal can be applied to an electric starter motor coupled to the engine 100, for example the starter motor 220. The safety test can be any suitable type of safety test. At decision step 308, when the safety test indicates that the DC signal cannot safely be applied, the method 300 returns to some previous step, for instance step 306, where the safety test can be performed again. Repeated failures of the safety test may cause the method 300 to terminate. When the safety test indicates that the DC signal can be applied safely, the method 300 proceeds to step 310.

At step 310, a circuit element, for example the circuit element 222, is commanded to apply the DC signal to the starter motor 220, which is coupled to the engine 100. The DC signal causes the starter motor 220 to counteract the windmilling of the engine 100, for example to reduce or prevent windmilling of the engine 100.

At step 312, the DC signal is modulated to control the level of rotational motion of the engine 100. The DC signal can be set to any suitable value to reduce and/or prevent windmilling of the engine 100. In some embodiments, the modulation of DC signal can be varied over time, for instance to gradually reduce the level of rotational motion in accordance with a predetermined schedule or to account for changes in the exterior causes of windmilling of the engine 100.

Figure 4:
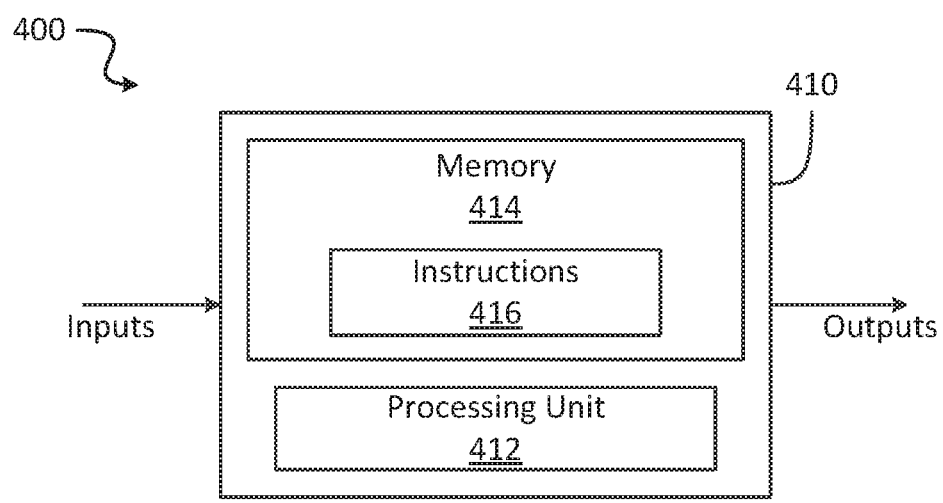
FIG. 4 is block diagram of an example computing device for implementing the method of FIG. 3, in accordance with one or more illustrative embodiments.

With reference to FIG. 4, the method of FIG. 3 may be implemented by a computing device 410 as an embodiment of the engine controller 210. The computing device 410 comprises a processing unit 412 and a memory 414 which has stored therein computer-executable instructions 416. The processing unit 412 may comprise any suitable devices configured to implement the functionality of the engine controller 210 such that instructions 416, when executed by the computing device 410 or other programmable apparatus, may cause the functions/acts/steps performed by the engine controller 210 as part of the method 300 and as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

It should be noted that the computing device 410 may be implemented as part of a FADEC or other similar device, including electronic engine control (EEC), engine control unit (ECU), engine electronic control system (EECS), and the like. In addition, it should be noted that the techniques described herein can be performed by the engine controller 210 substantially in real-time.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling windmilling of an engine of an aircraft during flight, the engine being an auxiliary power unit of the aircraft, the method comprising:

charging a direct current (DC) source during operation of the engine;

during flight of the aircraft, determining that the engine is windmilling and that a fire event is occurring in a vicinity of the engine;

when the engine is determined to be windmilling, rotational motion of a rotatable component of the engine is caused by the windmilling and the fire event is occurring, controlling the rotational motion of the rotatable component of the engine by:

commanding a circuit element to apply a DC signal from the DC source to an electric starter motor coupled to the rotatable component of the engine; and modulating the DC signal applied to the electric starter motor to reduce the rotational motion of the rotatable component of the engine.

2. The method of claim 1, wherein controlling the rotational motion of the rotatable component of the engine includes short-circuiting terminals of the electric starter motor to cause the electric starter motor to act as a load on the engine.

3. The method of claim 1, wherein controlling the rotational motion of the rotatable component of the engine includes maintaining a level of the rotational motion within a range suitable for ignition of the engine.

4. The method of claim 1, comprising modulating the DC signal to prevent the rotational motion.

5. The method of claim 4, comprising modulating the DC signal to gradually prevent the rotational motion.

6. The method of claim 1, comprising modulating the DC signal to reduce the rotational motion below a predetermined threshold.

7. The method of claim 6, wherein the predetermined threshold corresponds to a predetermined rotational speed of the rotatable component of the engine at or below which a lubricant system of the engine is inactive.

8. The method of claim 1, comprising determining whether the engine is windmilling by:
   determining whether a commanded engine operating state corresponds to the engine off state; and
   determining whether the rotational motion exceeds a predetermined windmilling threshold.

9. The method of claim 1, comprising determining whether the engine is windmilling by determining whether the aircraft to which the engine is coupled is airborne.

10. The method of claim 9, wherein determining whether the aircraft is airborne comprises determining an altitude of the aircraft.

11. The method of claim 1, further comprising, prior to commanding the circuit element to apply the DC signal to the electric starter motor, performing a safety test to assess whether the DC signal can be applied safely.

12. An aircraft system comprising:
   an auxiliary power unit (APU) for supplying electricity and compressed air;
   a direct current (DC) signal source chargeable during operation of the APU;
   an electric starter motor coupled to a rotatable component of the APU;
   a circuit element coupled to the electric starter motor and a DC signal source; and
   a control system coupled to the APU and to the circuit element, and configured for:
      determining whether the APU is windmilling by determining that an inlet duct to the APU is in an open position when the APU is in an off state;
      detecting that a fire event is occurring in a vicinity of the engine;
      during flight of the aircraft, when the APU is in the off state, and when rotational motion of the rotatable component of the APU is caused by the windmilling and the fire event is occurring, controlling the rotational motion of the rotatable component of the APU by:
         commanding a circuit element to apply a DC signal from the DC signal source to the electric starter motor coupled to the rotatable component of the APU; and
         modulating the DC signal applied to the electric starter motor to reduce the rotational motion of the rotatable component of the APU.

13. The aircraft system of claim 12, wherein the control system is configured for modulating the DC signal to prevent the rotational motion.

14. The aircraft system of claim 13, wherein the control system is configured for modulating the DC signal to gradually prevent the rotational motion.

15. The aircraft system of claim 12, wherein the control system is configured for modulating the DC signal to reduce the rotational motion below a predetermined threshold.

16. The aircraft system of claim 15, wherein the predetermined threshold corresponds to a predetermined rotational speed of the rotatable component of the APU at or below which a lubricant system of the APU is inactive.

17. The aircraft system of claim 12, wherein determining whether the APU is windmilling comprises:
   determining whether a commanded operating state of the APU corresponds to the off state; and
   determining whether the rotational motion exceeds a predetermined windmilling threshold.

18. The aircraft system of claim 12, wherein determining whether the APU is windmilling comprises determining whether the aircraft is airborne.

19. The aircraft system of claim 18, wherein determining whether the aircraft is airborne comprises determining an altitude of the aircraft.

20. The aircraft system of claim 12, further comprising, prior to commanding the circuit element to apply the DC signal to the electric starter motor, performing a safety test to assess whether the DC signal can be applied safely.

* * * * *